United States Patent [19]
Claytor et al.

[11] Patent Number: 6,037,594
[45] Date of Patent: Mar. 14, 2000

[54] MOTION DETECTOR WITH NON-DIVERGING INSENSITIVE ZONES

[75] Inventors: Richard N. Claytor; Luigi S. Fornari, both of Arlington, Tex.

[73] Assignee: Fresnel Technologies, Inc., Fort Worth, Tex.

[21] Appl. No.: 09/035,443

[22] Filed: Mar. 5, 1998

[51] Int. Cl.[7] ............ G01J 5/02; G08B 13/193; G08B 13/18
[52] U.S. Cl. .............. 250/353; 340/565; 340/567
[58] Field of Search ............ 250/353, DIG. 1; 340/567, 565

[56] References Cited

U.S. PATENT DOCUMENTS

| | | | |
|---|---|---|---|
| 2,931,912 | 4/1960 | Long, Jr. .................. | 250/209 |
| 3,703,718 | 11/1972 | Berman .................... | 340/258 |
| 3,886,360 | 5/1975 | Reiss et al. .............. | 250/338 |
| 3,928,843 | 12/1975 | Sprout et al. ............ | 340/258 |
| 3,958,118 | 5/1976 | Schwarz .................. | 250/221 |
| 4,225,786 | 9/1980 | Perlman .................. | 250/342 |
| 4,268,752 | 5/1981 | Herwig et al. ........... | 250/353 |
| 4,271,359 | 6/1981 | Herwig et al. ........... | 250/347 |
| 4,339,748 | 7/1982 | Guscott et al. .......... | 340/555 |
| 4,364,030 | 12/1982 | Rossin ................... | 340/567 |
| 4,375,034 | 2/1983 | Guscott .................. | 250/342 |
| 4,379,971 | 4/1983 | Smith et al. ............. | 250/342 |
| 4,429,224 | 1/1984 | Wagli et al. ............. | 250/342 |
| 4,442,359 | 4/1984 | Lederer .................. | 250/342 |
| 4,523,095 | 6/1985 | Keller-Steinbach ...... | 250/349 |
| 4,614,938 | 9/1986 | Weitman ................. | 340/567 |
| 4,617,463 | 10/1986 | Muirhead ................ | 250/342 |
| 4,644,147 | 2/1987 | Zublin ................... | 250/221 |
| 4,672,206 | 6/1987 | Suzuki et al. ........... | 250/342 |
| 4,703,171 | 10/1987 | Kahl et al. .............. | 350/221 |
| 4,757,204 | 7/1988 | Baldwin et al. ......... | 250/342 |
| 4,769,545 | 9/1988 | Fraden .................... | 250/353 |
| 4,772,797 | 9/1988 | Kahl ....................... | 250/353 |
| 4,778,996 | 10/1988 | Baldwin et al. ......... | 250/353 |
| 4,841,284 | 6/1989 | Biersdorff ............... | 340/567 |
| 4,876,445 | 10/1989 | McMaster ............... | 250/221 |
| 4,920,268 | 4/1990 | Walters et al. .......... | 250/353 |
| 4,930,864 | 6/1990 | Kuster et al. ........... | 350/167 |
| 5,103,346 | 4/1992 | Chang .................... | 359/855 |
| 5,187,360 | 2/1993 | Pasco ..................... | 250/208 |
| 5,442,178 | 8/1995 | Baldwin ................. | 250/353 |

OTHER PUBLICATIONS

Heimann, Technical Publication, Designing Passiv–Infrared Detectors.

Heimann, Technical Publication, Pyroelectric Detectors, possibly published Feb. 2, 1987.

Amperex Electric Corporation, Technical Publication, 213, Passive Infrared (PIR) Intruder Alarms, pp. 1–7, Apr. 1986.

Amperex Electric Corporation, Movement Sensing Using a Multi–Element Fresnel Lens, Apr. 1986, pp. 1–9, Apr. 1986.

*Primary Examiner*—Constantine Hannaher
*Assistant Examiner*—Adrianne Riviere
*Attorney, Agent, or Firm*—Max Ciccarelli; James E. Bradley; Felsman, Bradley, Vaden Gunter & Dillon, LLP

[57] ABSTRACT

A passive infrared motion detector that creates a detection pattern with non-diverging insensitive zones. The sensing elements are of alternating polarity and each has a width w. An optical collection system directs infrared radiation onto the sensing elements. The sensing elements are separated by a distance equal to an integer multiple of width w, with the integer being at least two. The optical centers of the optical collection system are separated by an integer multiple of width w, with the integer being at least two. The arrangement of the optical centers and the sensing elements results in a detection pattern with non-diverging insensitive zones, with the insensitive zones having a negligible width.

24 Claims, 8 Drawing Sheets

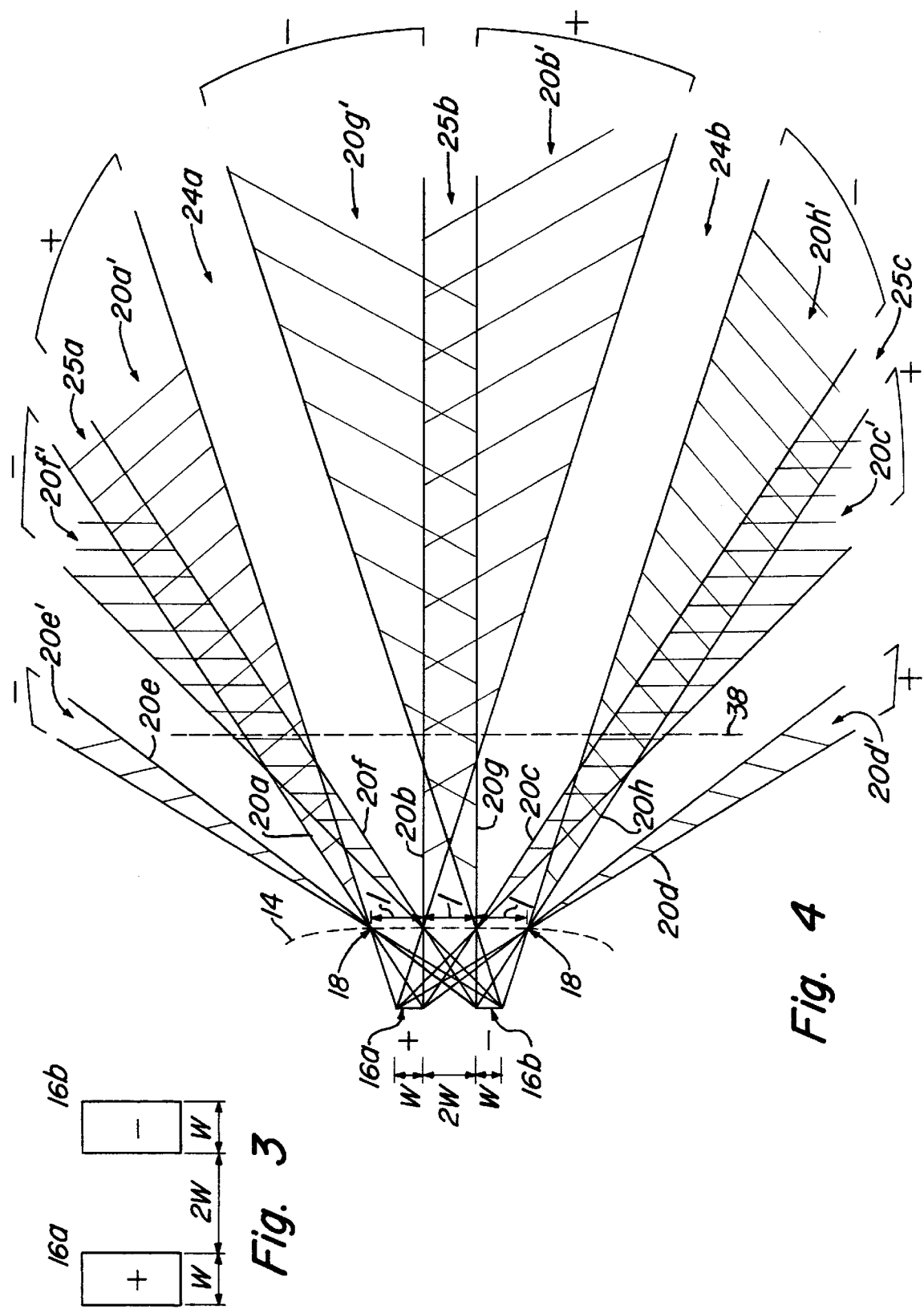

M=2 (NUMBER OF DETECTOR ELEMENTS)
l = 2W (LENSLET SPACING)
d = 2W (SENSING ELEMENT GAP)

M = 2 (NUMBER OF DETECTOR ELEMENTS)
l = 2w (LENSLET SPACING)
d = 6w (SENSING ELEMENT GAP)

M = 2 NUMBER OF DETECTORS ELEMENTS
l = 6w LENSLET SPACING
d = 2w DETECTORS ELEMENTS GAP

M = 4 NUMBER OF DETECTORS ELEMENTS
l = 6w LENSLET SPACING
d = 6w DETECTORS ELEMENT GAP

MOTION DETECTOR WITH NON-DIVERGING INSENSITIVE ZONES

BACKGROUND OF THE INVENTION

1. Field of the Invention

This invention relates in general to passive infrared motion detectors, and in particular to a passive infrared motion detector with a certain configuration of sensing elements together with an optical collection system that results in a detection pattern with no diverging insensitive zones in the volume of interest.

2. Description of the Prior Art

Passive infrared motion detectors generally use an optical collection system and multiple sensing elements of alternating polarity, or of same polarity but summed after alternately inverting and not inverting the signals from the sensing elements, to create a detection pattern in the volume of interest. Inherent in the detection patterns are insensitive zones in which the detector cannot sense motion. Most manufacturers currently use a configuration of sensing elements whereby each sensing element is separated from adjacent sensing elements by a gap approximately equal to the width of one sensing element. However, this popular configuration necessarily results in diverging insensitive zones as illustrated by the following discussion.

Referring to FIG. 1 and FIG. 2, the basic sensing element configuration of much of the prior art comprises an arrangement of pairs of oppositely poled sensing elements 16a and 16b (collectively referred to as sensing elements 16), constructed of a material that produces a usable signal when illuminated by infrared radiation (the most common range of infrared radiation used by motion detectors is between approximately 8 and 14 micrometers). In most of the prior art, each sensing element has a width w and is separated from other adjacent sensing elements by a gap roughly equal to width w. Typically, located in front of the sensing elements 16 is a lens array 13 with lens centers 18. Lens array 13 directs infrared radiation onto the sensing elements 16.

This arrangement of lens array and sensing elements results in a detection pattern with sensitive zones 20a and 20b (collectively referred to as sensitive zones 20) and diverging insensitive zones 22a and 22b (collectively referred to as insensitive zones 22). Sensitive zones 20a are the projection in space, through lenslet optical centers 18, of the sensing element 16a. Similarly, sensitive zones 20b are the projection in space, through lenslet optical centers 18, of the sensing element 16b. Insensitive zones 22 are areas from which radiation is not directed onto any of the sensing elements 16 (or depending on the geometry of the particular motion detector, areas in which positive and negative sensitive areas overlap and result in cancellation). Sensing elements 16 cannot detect motion in insensitive zones 22.

The problem that plagues the typical motion detectors of the prior art is that the insensitive zones 22 diverge, thereby getting larger with increasing distance from the lens array 13. This problem impedes detection of small movements at distances far from the detector. Manufacturers have unsuccessfully attempted to solve the problem of diverging insensitive zones in different ways.

One unsatisfactory solution which has been previously attempted is to juxtapose the two sensing elements. This configuration removes the diverging insensitive zones due to the gap between the sensing elements, but does not necessarily result in a uniform detection pattern. Further, this solution is unacceptable because it is accompanied by technical problems such as: electrical leakage between the elements; electrical breakdown from the high fields required for poling the elements; and thermal conduction between the elements which causes the energy focused on one element to diffuse to the element of opposite polarity, thereby reducing the signal. In an attempt to circumvent the above technical problems, some manufacturers have attempted leaving a space smaller than the width of each element between the elements. Although this technique somewhat alleviates the technical problems associated with juxtaposing the elements, it does not eliminate these technical problems and it reintroduces the problem of diverging insensitive zones.

Manufacturers and users are currently having to make and use passive infrared motion detectors with diverging insensitive zones.

SUMMARY OF THE INVENTION

The invention comprises a passive infrared motion detector with a certain arrangement of optical collection system and sensing elements. The sensing elements are of opposite polarity, or of same polarity but summed after alternately inverting and not inverting the signals from the sensing elements. The sensing elements are constructed of any radiation-sensitive material that will produce a usable electrical signal when it detects infrared radiation. Each sensing element has a width w and is positioned so that the gap between adjacent elements is an integer multiple of width w greater than or equal to two. The optical collection system serves to focus infrared radiation onto the detection means. The optical collection system is configured to have optical centers spaced apart from each other by a distance equal to an integer multiple of width w greater than or equal to two.

In the preferred embodiment there are two sensing elements, with those sensing elements being pyroelectric elements of opposite polarity. Each sensing element has a width w, and the gap between the two elements is equal to two times width w. The optical collection system of the preferred embodiment is a refractive lens array, such as a Fresnel type lens array, which is made up of several lenslets which together form a lens array having various optical centers. The lens array is located at a distance from the sensing elements approximately equivalent to the focal length f of the individual lenslets. The spacing between each optical center is equivalent to two times width w. In the preferred embodiment, the lens array is mounted in the appropriate relationship with the sensing elements so as to direct infrared radiation from the volume of interest onto the sensing elements.

Such a configuration of sensing elements and lens array results in a detection pattern with no diverging insensitive zones, as defined later, and with insensitive zones that are very small (on the order of four times width w) with respect to the volume of interest. The fact that the insensitive zones do not diverge means that the insensitive zones do not become unacceptably large at large distances from the motion detector. This results in an acceptable detection pattern even at a distance far from the motion detector. The prior-art motion detectors, on the other hand, because of the diverging insensitive zones, resulted in unacceptably large insensitive zones far from the motion detector, allowing unacceptably large motions to go undetected.

BRIEF DESCRIPTION OF THE DRAWINGS

FIG. 3 is a front view of the preferred arrangement of sensing elements disclosed in this patent.

FIG. 4 is a top view of the detection pattern that results from the preferred embodiment disclosed in this patent.

DETAILED DESCRIPTION OF THE INVENTION

Figure 1:
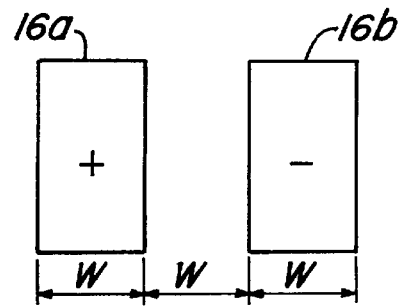
FIG. 1 is a front view of the most common sensing element arrangement used in the prior art.

The preferred embodiment for a motion detector depends in large part on the intended application. The preferred embodiment described here is for a typical motion detector of the type used to detect intrusion into a given volume of interest. This type of motion detector typically uses refractive optical collection systems (usually in the form of a lens array) to focus the infrared radiation onto the sensing elements. However, it is known in the art that reflective and diffractive optical collection systems can be used in place of the refractive ones. In this type of motion detector, the sensing elements are typically arranged side by side and on a flat plane, as shown in FIG. 1. However, the sensing elements can be placed on curved surfaces or along curves in space, or could even be placed on different surfaces. Similarly, the optical centers of the optical collection system are typically arranged on a curved lens array. However, the lens array could be flat or could take the shape of any number of curved surfaces. The selection of the above options is usually determined by the application for which the motion detector is intended.

Thus, although the preferred embodiment of the present invention disclosed herein uses a refractive optical collection system having a particular geometry, it should be understood that those skilled in the art can apply the principles of this invention to motion detectors using refractive optical collection systems of different geometries, or even reflective and diffractive optical collection systems or combinations thereof. Those skilled in the art would also appreciate that the principles of this invention can also be applied to different geometries of sensing elements (for example, sensing elements located along a curved surface) or of optical elements (for example, multiple optical elements in series).

The preferred embodiment of the invention is shown in FIGS. 3–5. Referring first to FIG. 3 and FIG. 4, each of the sensing elements 16a and 16b has a width w. Sensing elements 16 are of opposite polarity, or of the same polarity but summed after alternately inverting and not inverting the signals from the sensing elements 16. Like the sensing elements 16 of the prior art, the sensing elements 16 of this invention can be constructed of any material that produces a usable signal when illuminated by infrared radiation. The preferred material is probably a pyroelectric material, but other suitable sensing elements include thermopiles and bolometers. The sensing elements 16a and 16b are positioned so that the gap between them is equivalent to twice width w.

Lens array 14 is a curved refractive lens array of the Fresnel lens type. Over a span of a few lenslets, the typical curvature is sufficiently slight that the lenslets can be considered to lie in a plane, particularly because of the large "pixel size" (width w) of the detector. Fresnel type lens arrays are made up of several lenslets, each having an optical center 18, which together form the lens array 14. Lens array 14 is located at a distance from the sensing elements 16 approximately equivalent to the focal length of the individual lenslets. The optical centers 18 are positioned so that the distance between adjacent optical centers is equivalent to twice width w. Lens array 14 focuses infrared radiation onto sensing elements 16.

Referring now primarily to FIG. 4, the above described positioning of optical centers 18 and sensing elements 16 results in the sensing elements 16 being able to sense infrared radiation emanating from objects located within a pattern of sensitive zones 20a–20h (collectively referred to as sensitive zones 20). The sensitive zones 20 are essentially the projection in space, through the lens centers 18, of the sensing elements 16. The lenslets represented by optical centers 18 direct radiation from sensitive zones 20a–20d onto sensing element 16a. Sensitive zones 20a–20d are arbitrarily referred to as positive (+) sensitive zones. The lenslets represented by optical centers 18 direct radiation from sensitive zones 20e–20h onto sensing element 16b, and are arbitrarily referred to as negative (−) sensitive zones.

Looking at sensitive zones 20 at points further removed from lens array 14, it is noticed that certain of the positive (+) sensitive zones overlap certain of the negative (−) sensitive zones. For example, positive (+) sensitive zone 20a (which is marked with single hatching) overlaps negative (−) sensitive zone 20f (which is marked with single hatching in the direction opposite to the hatching of positive sensitive zone 20a). The resulting overlap is the area that appears to be cross-hatched and which is labeled 25a (referred to herein as cancelled zone 25a). Radiation emitted in cancelled zone 25a is directed to both the positive sensing element 16a and the negative sensing element 16b more or less equally, therefore resulting in substantial cancellation of the signal. The cancellation of the signal results in cancelled zone 25a being an insensitive zone. A similar analysis of zones 20b and 20g, and 20c and 20h, shows the resulting cancelled zones 25b and 25c (collectively referred to as cancelled zones 25).

Because at distances removed from the lens array 14 a portion of some of the sensitive zones 20 is cancelled by a portion of one of the sensitive zones 20 of opposite polarity, only positive (+) zones 20a', 20b', 20c', and 20d', and only negative (−) zones 20e', 20f', 20g', and 20h' remain effective far from lens array 14. (Effective sensitive zones 20a'–20h' are collectively referred to as effective sensitive zones 20').

The effective sensitive zones 20a'–20d' and 20g'–20h' and cancelled zones 25 do not cover the entire volume of interest. Zones remain in which radiation is not directed to either of the sensing elements 16. These zones are referred to as dead zones 24a and 24b (collectively referred to as dead zones 24). Radiation emitted from objects located in dead zones 24 is not directed onto any of the sensing elements 16, and hence is not detected. Thus, dead zones 24, like cancelled zones 25, are insensitive. (Dead zones 24 and cancelled zones 25 are collectively referred to as insensitive zones 24, 25).

The unique characteristic of this invention is that the boundaries of each insensitive zone 24, 25 do not diverge. The insensitive zones 24, 25 start as zones with diverging boundaries at distances close to the lens array 14, but the boundaries quickly transition to being parallel (at a distance from the lens array 14 equal to about three times the focal length of the lenslets), thus making insensitive zones 24, 25 non-diverging. The maximum width of insensitive zones 24, 25, even at distances "far" (that is, beyond the distance at which the order of the pattern changes; for example, beyond dashed line 38) from the lens array 14, is approximately equivalent to four times width w.

In practice, it is impossible to achieve such well defined edges to the detection pattern. Scattering from inhomogeneities in the lens, scratches on the surface of the lens, and errors in the surface of the lens combine with lateral thermal diffusion in the detector to spread the patterns. Nevertheless, with appropriate design and quality control, detection patterns close to those described here can be achieved to make use of the non-divergence of the insensitive zones 24, 25.

Figure 5A:
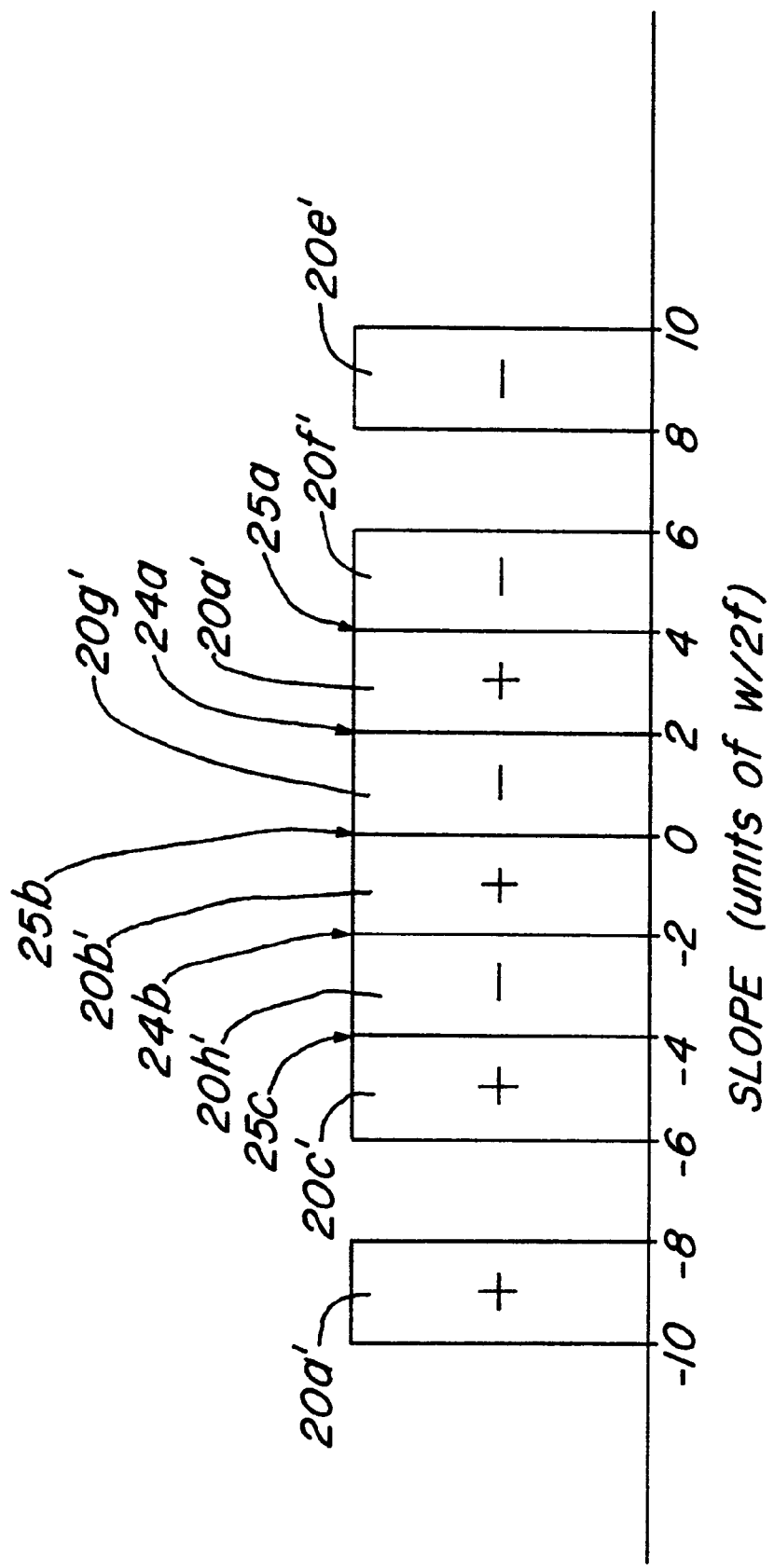
FIGS. 5A–5E are schematic representations showing the patterns at distances far from the motion detector configuration of FIG. 4 and variations thereof.
Figure 5B:
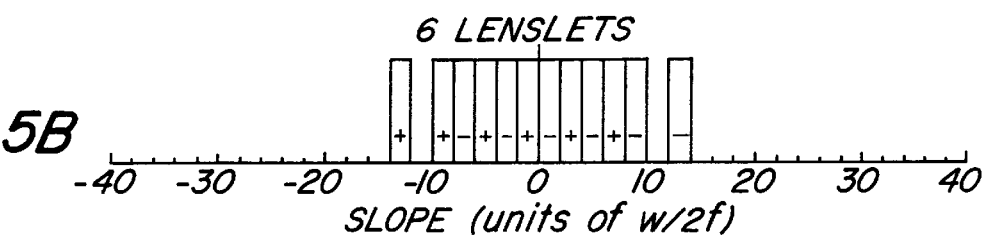
Figure 5C:
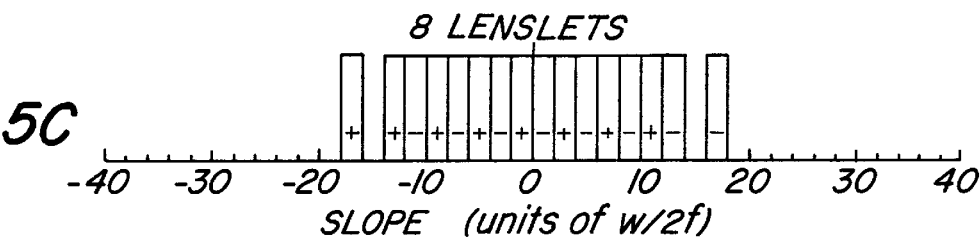
Figure 5D:
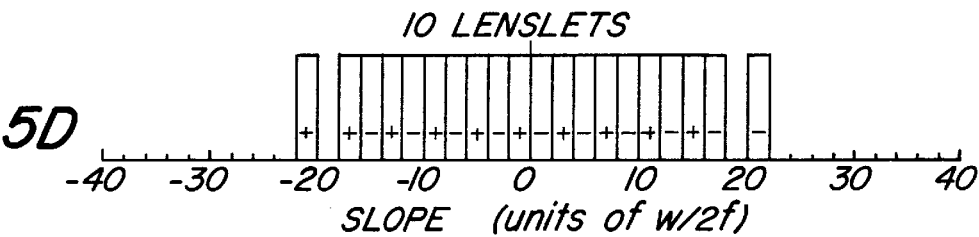
Figure 5E:
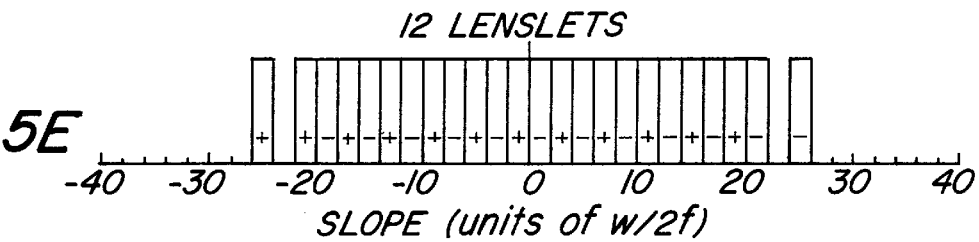

To further understand the invention, reference is now made to FIG. 5A. FIG. 5A is a schematic representation of the projection of effective sensitive zones 20' at a very large distance from the lens array 14 and on a plane parallel to the surface of sensing elements 16. FIG. 5A is generated by calculating the slope of the boundary lines for each effective sensitive zone 20' and plotting those on FIG. 5A. For example, the boundary lines for effective sensitive zone 20e' have slopes of 8 w/2f and 10 w/2f. Similarly, the boundary lines for effective sensitive zone 20a' have slopes of 4 w/2f and 6 w/2f. "Far" from the lens array, each effective sensitive zone 20' has a very large width, because the effective sensitive zones are diverging. Yet, the insensitive zones 24, 25 are of fixed width. Because the horizontal axis of FIG. 5A represents slope, the widths of the effective sensitive zones are shown as finite in FIG. 5A (for example, from a slope of 4 w/2f to a slope of 6 w/2f for effective sensitive zone 20f'), and the insensitive zones are shown as vertical lines because the boundaries of the insensitive zones are parallel (that is, non-diverging) and therefore have the same slope.

FIG. 5A does contain two diverging insensitive zones, in addition to the non-diverging insensitive zones 24, 25. These diverging insensitive zones lie between sensitive zones 20d', 20c' and 20e', 20f'. The diverging insensitive zones are due to effects at the ends of the row of lenslets, and may be explained quite simply. Careful examination of FIG. 4 reveals that neighboring lenslets cooperate in producing the nondiverging insensitive zones 24, 25. For instance, sensitive zones 20a' and 20f', which overlap to produce cancelled zone 25a, are the projections of sensing elements 16a and 16b through adjacent optical centers; similarly, dead zone 24a is between sensitive zones 20a' and 20g', which are the projections of sensing elements 16a and 16b through next-nearest neighbor optical centers. It may therefore be seen that in this configuration of sensing elements and optical centers, the cooperation of three lenslets is required in order to produce the complete pattern of non-diverging insensitive zones. The lenslets at the ends of the row have no neighbors at larger angles, and therefore the cooperation between neighbors in producing nondiverging insensitive zones cannot occur at the ends of the row of lenslets. In fact, examination of FIGS. 6A–6F shows that larger gaps between the sensing elements require the cooperation of even more neighboring lenslets to produce nondiverging insensitive zones; a gap of 6 w requires the cooperation of four lenslets to "fill in the spaces".

Figure 2:
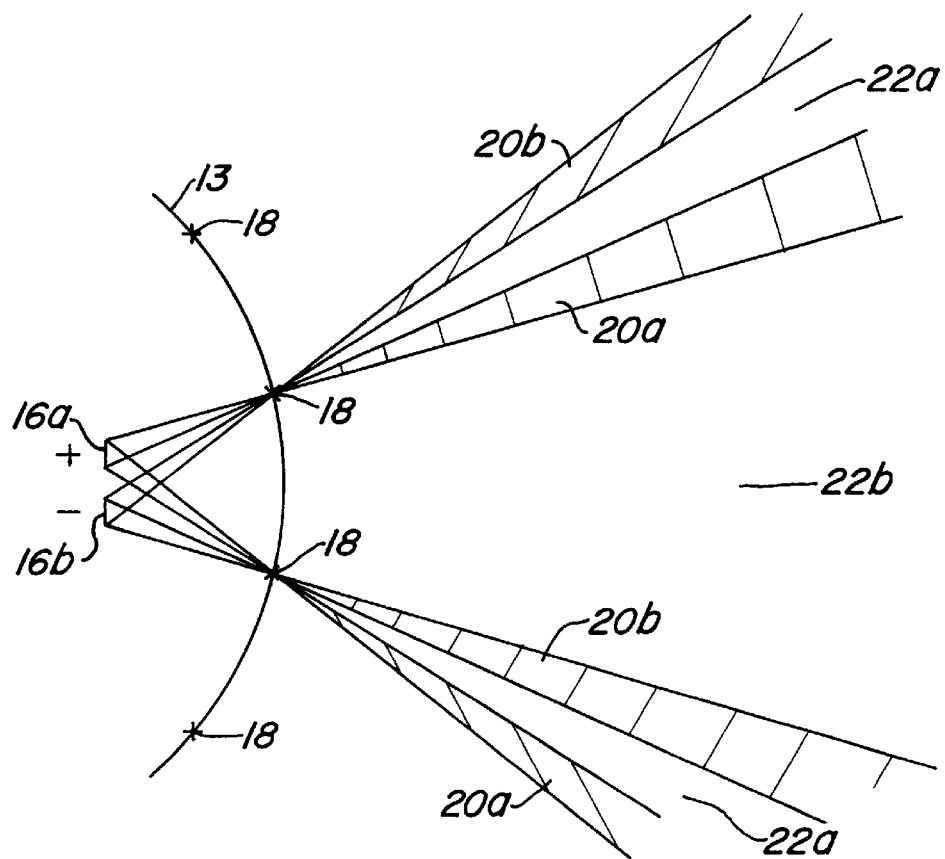
FIG. 2 is a top view of the detection pattern that results from the arrangement of sensing elements shown in FIG. 1 and lens array typically used in the prior art.

The information shown in the schematic of the type used in FIG. 5A can also be obtained and seen from the schematics of the type shown in FIGS. 2 and 4. However, the format of FIG. 5A can be a convenient format for visualizing the detection pattern "far" from the lens array. Slope equations for the boundaries of the effective sensitive zones 20' can also be programmed into well-known computer software packages (such as Mathematica) to automatically generate figures of the type of FIG. 5A.

To have an effective motion detector, it is desired to have, at least for the volume of interest, adjacent sensitive zones of alternating polarity, with minimum angular separation in between the zones. As seen in FIG. 5A, the polarities of the effective sensitive zones 20c', 20h', 20b', 20g', 20a', and 20f' are (+), (−), (+), (−), (+), (−), respectively. Also, the largest separation between these effective sensitive zones is the width of dead zone 24a or 24b, which is only in the order of 4 w. Given that the sensing elements are usually about one millimeter in width, the width of dead zone 24a or 24b is only approximately four millimeters. In practice, optical aberrations and the width of the human body cause a smearing of images which obliterate this tiny dead zone. Thus, the angular extent of the detection pattern of the effective sensitive zones 20c', 20h', 20b', 20g', 20a', and 20f' is ideal for detecting motion. This angular extent, from a line of slope 6 w/2f to a line of slope −6 w/2f, is the useful, or ideal, detection pattern of the motion detector of FIG. 4, and should thus be used to effectively cover the volume of interest.

If additional lenslets are added, the projection of effective sensitive zones 20' changes as shown in FIGS. 5B–5E, for the case of 6, 8, 10, and 12 optical centers, respectively. By adding more lenslets (for a total of 12 in FIG. 5E), the useful angular extent of the motion detector increases to the area between a line of slope 22 w/2f and a line of slope −22 w/2f. Referring to FIGS. 5B–5F, the signs in the boxes (the boxes representing the projection of the sensitive zones "far" from the lens array) represent the polarity of the zones. FIGS. 6A–6F, 7A–7F, and 8A–8F use the same nomenclature.

The configuration shown in FIG. 4 (that is, two sensing elements with gap of 2 w and four optical centers with spacing of 2 w) is by no means the only configuration that results in a useful detection pattern of sensitive zones of alternating polarity with thin, non-diverging insensitive zones separating those sensitive zones. Using d as the gap between sensing elements 16 of width w, l as the spacing between optical centers 18, M as the number of sensing elements 16, and N as the number of optical centers 18, the configuration of FIG. 4 would be: d=2 w, l=2 w, M=2, and N=4. The following are some other configurations that result in useful detection patterns with non-diverging insensitive zones:

| d | l | M | N |
|---|---|---|---|
| 2w | 2w | 2, 4, 6, 8, etc. | ≧3 |
| 4w | 2w | 2, 4, 6, 8, etc. | ≧5 |
| 6w | 2w | 2, 4, 6, 8, etc. | ≧7 |
| 4w | 4w | 4, 6, 8, etc. | ≧5 |

-continued

| d  | l  | M           | N  |
|----|----|-------------|----|
| 6w | 4w | 4, 6, 8, etc. | ≧7 |
| 6w | 6w | 6, 8, etc.  | ≧7 |

Figure 6A:
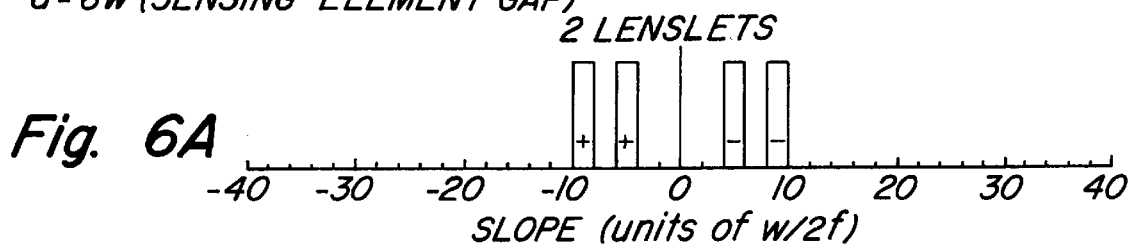
FIGS. 6A–6F are schematic representations showing the patterns at distances far from the motion detector of variations on an alternative embodiment of the present invention.
Figure 6B:
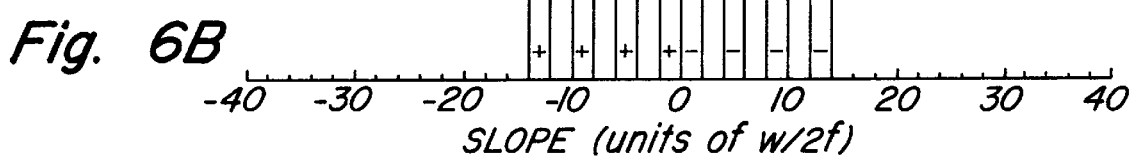
Figure 6C:
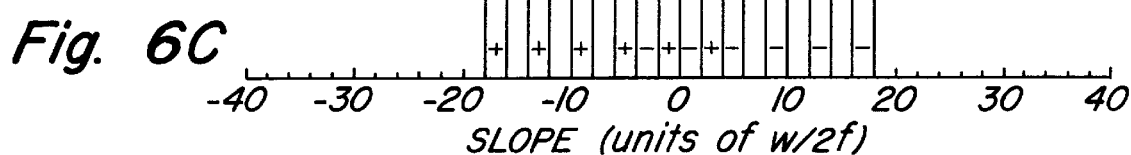
Figure 6D:
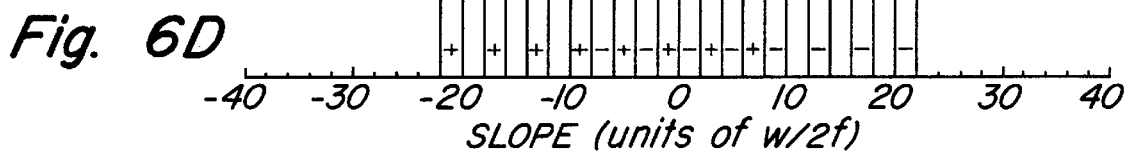
Figure 6E:
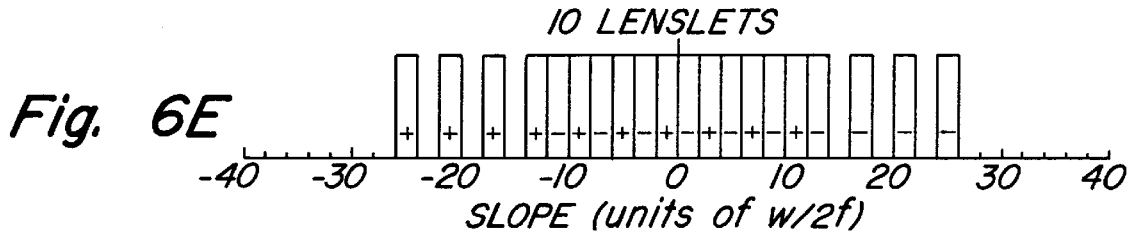
Figure 6F:
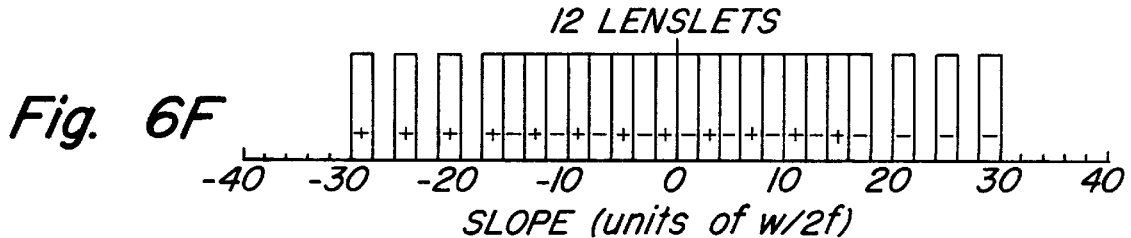
Figure 7A:
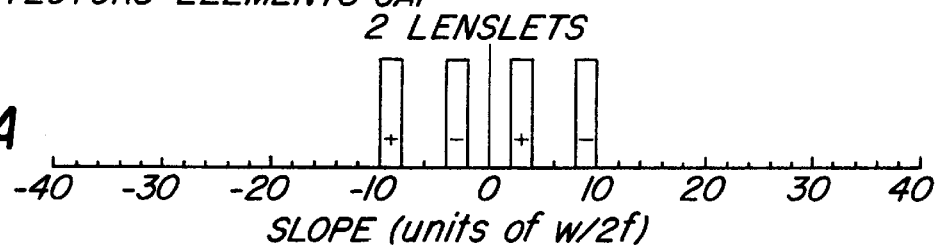
FIGS. 7A–7F are schematic representations showing the patterns at distances far from the motion detector of certain motion detector configurations which do not result in satisfactory detection patterns.
Figure 7B:
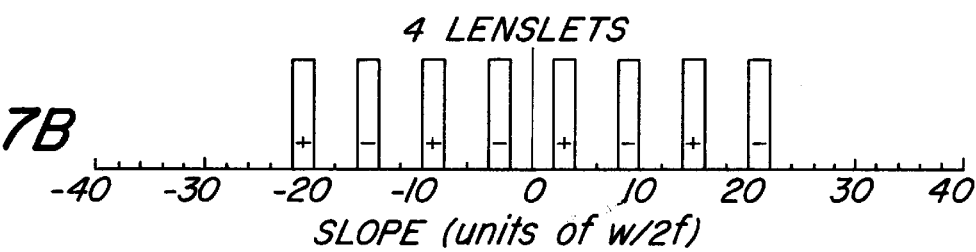
Figure 7C:
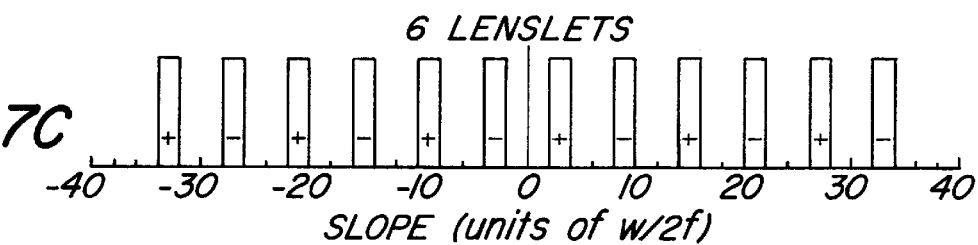
Figure 7D:
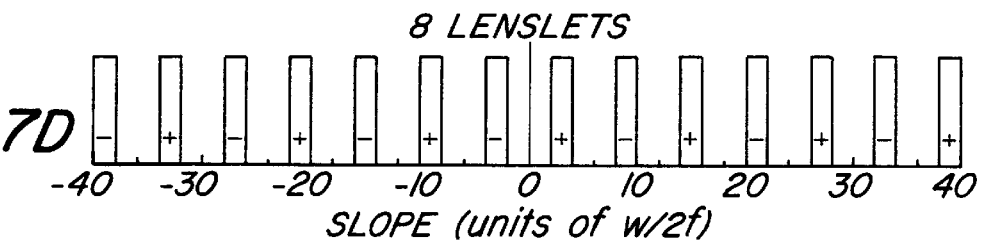
Figure 7E:
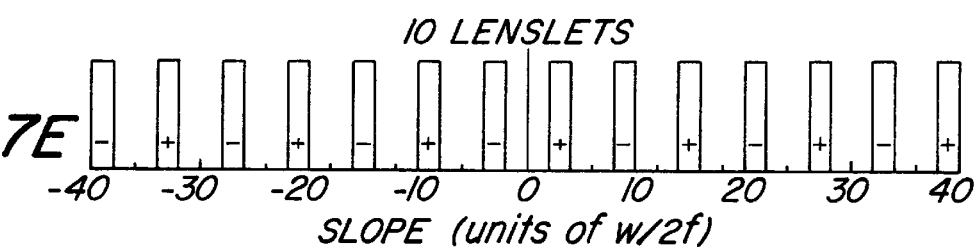
Figure 7F:
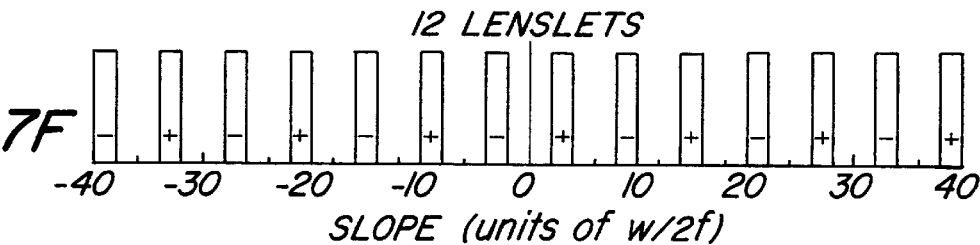
Figure 8A:
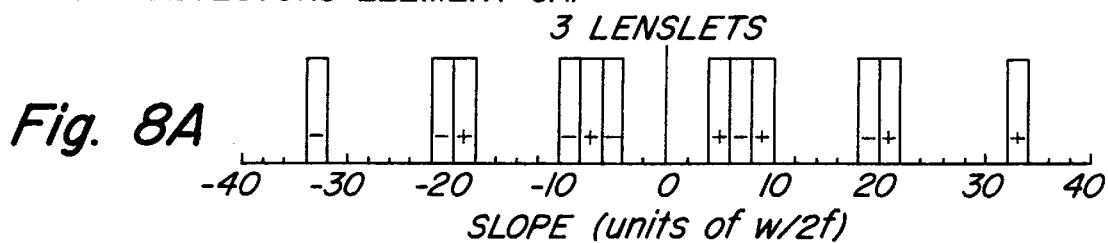
FIGS. 8A–8F are schematic representations showing the patterns at distances far from the motion detector of certain other motion detector configurations which do not result in satisfactory detection patterns.
Figure 8B:
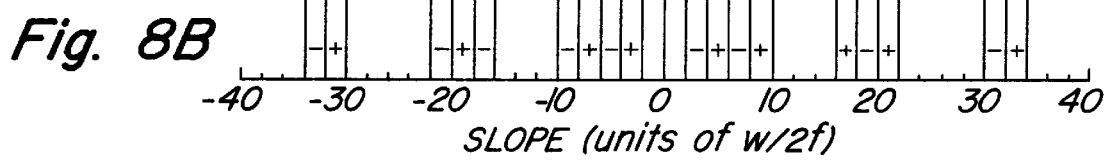
Figure 8C:
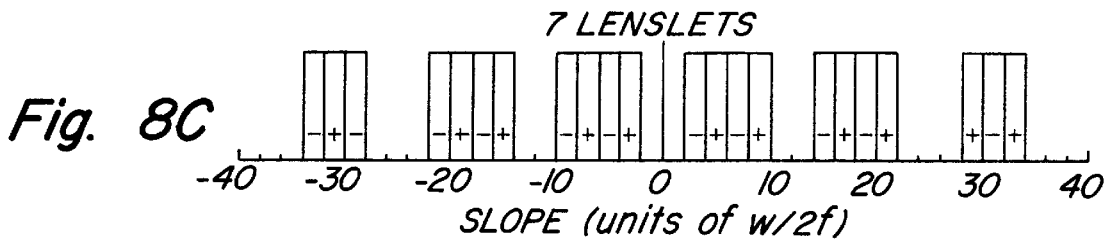
Figure 8D:
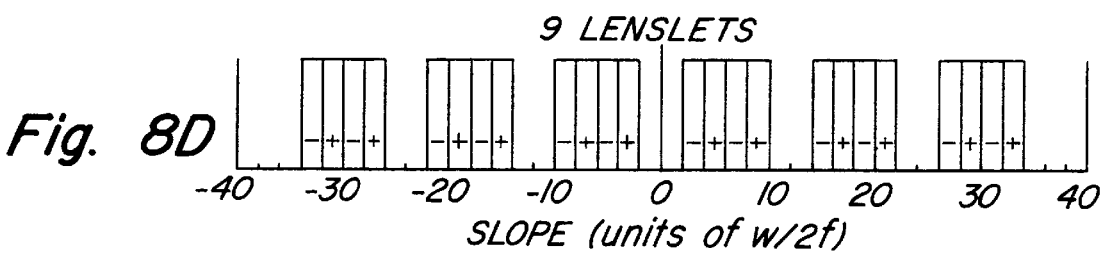
Figure 8E:
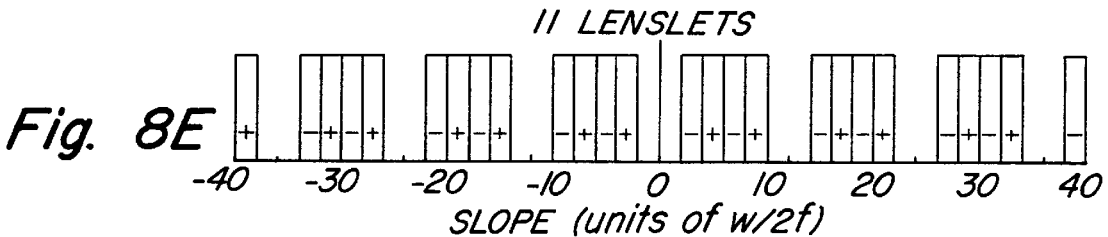
Figure 8F:
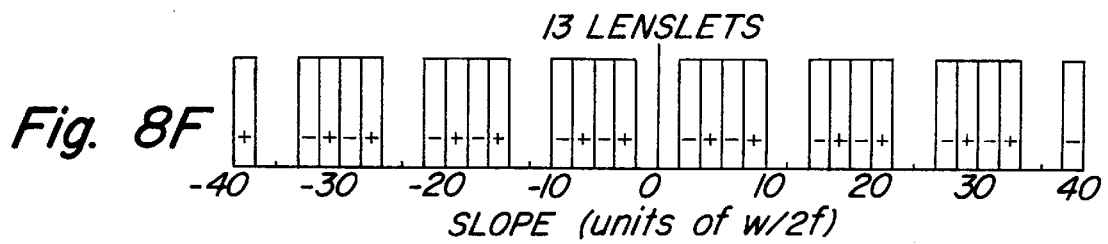

FIGS. 6A–6F show the projection of the effective sensitive zones for the d=6 w, l=2 w, M=2, and N=2, 4, 6, 8, 10, and 12 configurations, respectively. Referring first to FIG. 6A, in which N=2, all the insensitive zones are diverging, and the detection pattern is not satisfactory. Referring next to FIG. 6B, in which N=4, there are two sensitive areas of alternating polarity with a non-diverging insensitive zone in between them (the insensitive zone is at slope=0); however, this pattern is not desirable because the useful angular extent of this detector is only between the angles corresponding to the slopes of −2 w/2f and 2 w/2f. Referring next to FIG. 6C, in which N=6, there are six adjacent sensitive zones of alternating polarity, with a non-diverging insensitive zone in between each of the six sensitive zones (the non-diverging insensitive zones being at slope=4, 2, 0, −2, and −4 in units of w/2f). Although this pattern could be acceptable, the patterns of FIGS. 6D–6F are even better, because the angular extent of the detection pattern of the motion detector is even wider.

Certain configurations of number of sensing elements (M), sensing element spacing (d), and optical center spacing (l) are not satisfactory for any number of optical centers (N). For example, FIGS. 7A–7F show the projection of the sensitive zones for the configurations of d=2 w, l=6 w, M=2, and N=2, 4, 6, 8, 10, and 12, respectively. In each of the configurations of FIGS. 7A–7F every insensitive zone diverges and the detection pattern is not acceptable. As another example, FIGS. 8A–8F show the projection of the sensitive zones for the configurations of d=6 w, l=6 w, M=4, and N=3, 5, 7, 9, 11, and 13, respectively. In each of the configurations of FIGS. 8A–8F there are regions (for example, in FIG. 8A from slope 4 w/2f to slope 10 w/2f, and in FIGS. 8B–8F from slope 2 w/2f to slope 10 w/2f) having sensitive zones of alternating polarity with non-diverging insensitive zones therebetween. However, as can be seen from FIGS. 8A–8F, regardless of the number of optical centers being used, the useful angular extent does not become wider than the one corresponding to a slope range of 8 w/2f. There may be multiple, somewhat useful, sub-ranges in each configuration (for example, in FIG. 8C, from slope −22 w/2f to slope −14 w/2f, from slope −10 w/2f to slope −2 w/2f, from slope 2 w/2f to slope 10 w/2f, and from slope 14 w/2f to slope 22 w/2f), but each sub-range is separated from the other sub-ranges by a diverging insensitive zone.

The above two examples and some other examples of unsatisfactory configurations are listed below:

| d  | l  | M    |
|----|----|------|
| 2w | 4w | 2    |
| 4w | 4w | 2    |
| 6w | 4w | 2    |
| 2w | 6w | 2, 4 |
| 6w | 6w | 2, 4 |

Apart from the unique detection patterns of this invention, this invention functions in a fashion similar to other passive infrared motion detectors currently on the market. When a body that emits infrared radiation crosses any two sensitive zones 20 and/or 20' of opposite polarity, the infrared radiation emitted by the body causes sensing elements 16 to produce an electrical signal. The electrical signal can then be processed for use in various applications.

Figure 9:
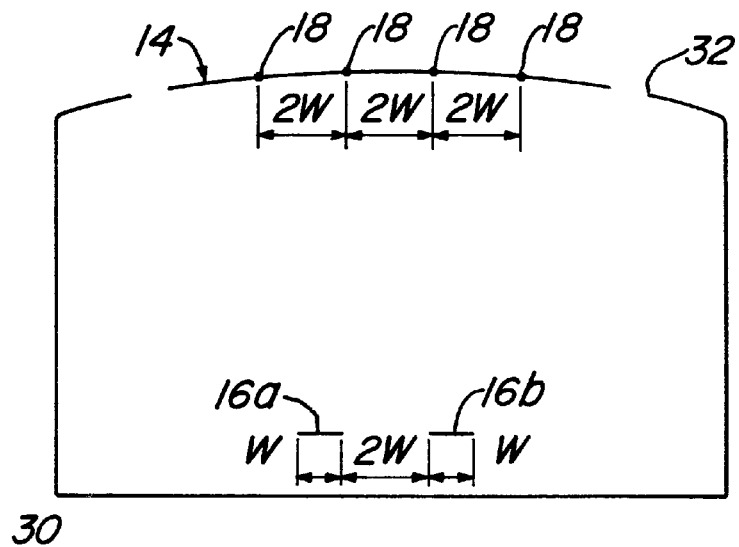
FIG. 9 shows a schematic top view of a typical configuration for refractive and diffractive optical collection systems.
Figure 10:
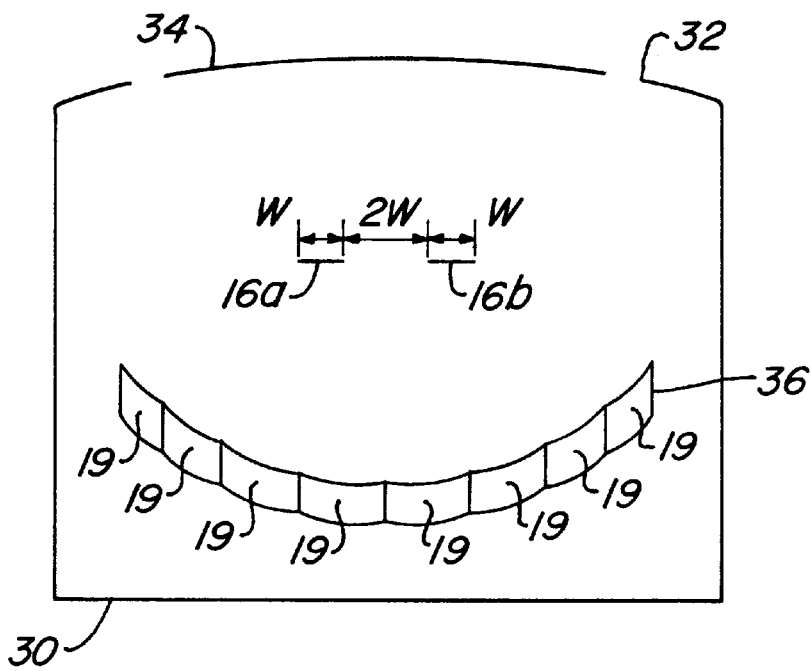
FIG. 10 shows a schematic sectioned representation of a detector using a reflective optical collection system.

FIGS. 9 and 10 show how the sensing element and optical collection system configuration would differ when a reflective optical collection system is used instead of a refractive or diffractive optical collection system. Referring first to FIG. 9, a schematic top view of a typical configuration for refractive and diffractive optical collection systems is shown. Sensing elements 16a and 16b are located inside housing 30. A refractive or diffractive lens array 14 having optical centers 18 is located at an opening 32 of the housing 30.

Referring next to FIG. 10, a schematic representation of a detector using a reflective optical collection system is shown. FIG. 10 is a schematic top view of a typical configuration for a reflective optical collection system. An infrared transmitting film is located across opening 32 in housing 30. The sensing elements 16a and 16b are located toward the front of housing 30 rather than the rear, and are oriented such that the sensitive side faces the rear of housing 30. A segmented mirror 36 is located toward the rear of housing 30 and is positioned so as to reflect radiation onto sensing elements 16a and 16b.

A ray parallel to the incoming rays and passing through the center of curvature of a spherical mirror will intersect the spherical shell on which the mirror lies in the optical center. The focal point (at which the detector is usually placed in collection systems) will be half way between the optical center and the center of curvature of the mirror. The mirrors' optical centers (shown in phantom) are labeled with the numerals 19 in FIG. 10.

This invention has substantial advantages over the prior art. This invention produces a uniform pattern of sensitive areas of alternating polarity with non-diverging insensitive zones of negligible size. This is a drastic improvement over the prior art since the prior art creates diverging insensitive zones in the volume of interest. Because of the extremely small and uniform width of the insensitive zones of this invention, this invention allows detection of small movements even at large distances from the detector, a task not previously possible.

While the invention has been shown in only one of its forms, it should be apparent to those skilled in the art that it is not so limited, but is susceptible to various changes without departing from the scope of the invention.

What is claimed is:

1. An improved motion detector comprising an optical collection system for directing radiation emitted within any of a plurality of sensitive zones onto sensing elements, the improved motion detector comprising:

at least two sensing elements connected so as to be equivalent to sensing elements of opposite polarity, each of the at least two sensing elements having a width w and being a means for receiving radiation and converting the radiation into an electrical signal, each of the at least two sensing elements having a gap from an adjacent sensing element equivalent to a first integer multiple of width w, with the first integer multiple being at least two; and an optical collection system that directs radiation onto the sensing elements, the optical collection system having at least two optical centers with each of the at least two optical centers having a separation from an adjacent optical center equivalent to a second integer multiple of width w, with the second integer multiple being at least two, wherein a volume of interest having adjacent sensitive zones of alternating polarity with non-diverging insensitive zones therebetween results and wherein the radiation from the sensitive zones in the volume of interest is directed onto the sensing elements.

2. The motion detector of claim 1 wherein the first integer multiple is even.

3. The motion detector of claim 1 wherein the second integer multiple is even.

4. The motion detector of claim 1 wherein both the first and the second integer multiples are even.

5. The motion detector of claim 1 wherein the number of sensing elements is at least as large as the second integer multiple.

6. The motion detector of claim 1 wherein the number of optical centers is at least as large as the first integer multiple.

7. The motion detector of claim 1 wherein the optical collection system is a refractive system.

8. The motion detector of claim 1 wherein the optical collection system is a reflective system.

9. The motion detector of claim 1 wherein the optical collection system is a diffractive system.

10. The motion detector of claim 1 wherein the radiation is infrared radiation.

11. The motion detector of claim 1 wherein the radiation is infrared radiation in the range between approximately 8 and 14 micrometers.

12. An improved infrared motion detector comprising an optical collection system for directing infrared radiation emitted within any of a plurality of sensitive zones onto sensing elements, the improved motion detector comprising:

at least two sensing elements connected so as to be equivalent to sensing elements of opposite polarity, each of the at least two sensing elements having a width w and being a means for receiving infrared radiation and converting the radiation into an electrical signal, each of the at least two sensing elements having a gap from an adjacent sensing element equivalent to a first even integer multiple of width w, with the first even integer multiple being at least two; and an optical collection system that directs infrared radiation onto the sensing elements, the optical collection system having at is least two optical centers with each of the at least two optical centers having a separation from an adjacent optical center equivalent to a second even integer multiple of width w, with the second even integer multiple being at least two, wherein a volume of interest having adjacent sensitive zones of alternating polarity with non-diverging insensitive zones therebetween results and wherein the infrared radiation from the sensitive zones in the volume of interest is directed onto the sensing elements.

13. The infrared motion detector of claim 12 wherein the number of sensing elements is at least as large as the second integer multiple.

14. The infrared motion detector of claim 12 wherein the number of optical centers is at least as large as the first integer multiple.

15. The infrared motion detector of claim 12 comprising at least as many optical centers as one plus the value of the first even integer multiple.

16. The infrared motion detector of claim 12 wherein the optical collection system is a refractive system.

17. The infrared motion detector of claim 12 wherein the optical collection system is a reflective system.

18. The infrared motion detector of claim 12 wherein the optical collection system is a diffractive system.

19. A method of designing an infrared motion detector of the type comprising an optical collection system for directing infrared radiation emitted within any of a plurality of sensitive zones onto a plurality of sensing elements, the sensing elements having a width w and being designed to receive infrared radiation and convert the radiation into an electrical signal, the sensing elements being connected so as to be equivalent to sensing elements of opposite polarity, the optical collection system having at least two optical centers, the method comprising:

selecting the gap between the sensing elements so that the gap is equal to a first integer multiple of width w, with the first integer multiple being at least two;

selecting the spacing between optical centers so that the spacing is equal to a second integer multiple of width w, the second integer multiple being at least two, wherein a volume of interest having adjacent sensitive zones of alternating polarity with non-diverging insensitive zones therebetween is achieved.

20. The method of claim 19 wherein the first integer multiple is even.

21. The method of claim 19 wherein the second integer multiple is even.

22. The method of claim 19 wherein both the first and second integer multiples are even.

23. The method of claim 19 further comprising the step of selecting the number of sensing elements to be at least as large as the second integer multiple.

24. The method of claim 19 further comprising the step of selecting the number of optical centers to be at least as large as the first integer multiple.

* * * * *